(12) United States Patent
Chou et al.

(10) Patent No.: US 11,187,559 B2
(45) Date of Patent: Nov. 30, 2021

(54) CODE DISK, OPTICAL DETECTOR, OPTICAL ABSOLUTE ROTARY ENCODER AND ENCODED-VALUE-OUTPUTTING METHOD WITH ERROR DETECTION AND CORRECTION

(71) Applicant: INDUSTRIAL TECHNOLOGY RESEARCH INSTITUTE, Hsinchu (TW)

(72) Inventors: Ming-Chieh Chou, Kaohsiung (TW); Kuo-Chih Wang, Tainan (TW); Chi-Hung Lee, Hsinchu County (TW); Yi-Cheng Chen, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 193 days.

(21) Appl. No.: 16/432,383

(22) Filed: Jun. 5, 2019

(65) Prior Publication Data
US 2020/0209018 A1 Jul. 2, 2020

(30) Foreign Application Priority Data
Dec. 26, 2018 (TW) .................................. 107147145

(51) Int. Cl.
*G01D 5/347* (2006.01)
(52) U.S. Cl.
CPC ....... *G01D 5/34792* (2013.01); *G01D 5/3473* (2013.01)
(58) Field of Classification Search
CPC ............. G01D 5/34792; G01D 5/3473; G01D 5/34776
See application file for complete search history.

(56) References Cited

U.S. PATENT DOCUMENTS

| 4,311,987 A | 1/1982 | Taillebois |
| 4,899,048 A | 2/1990 | Shelander |

(Continued)

FOREIGN PATENT DOCUMENTS

| CN | 101571409 A | 11/2009 |
| CN | 102483336 A | 5/2012 |

(Continued)

OTHER PUBLICATIONS

Taiwanese Office Action issued in corresponding application No. 107147145, dated Jul. 26, 2019.

(Continued)

*Primary Examiner* — Thanh Luu
*Assistant Examiner* — Monica T Taba
(74) *Attorney, Agent, or Firm* — Maschoff Brennan

(57) ABSTRACT

A code disk is adapted to an optical absolute rotary encoder. The code disk is divided into a plurality of columns, with the plurality of columns disposed in a circumferential direction around a center position and respectively extending in a plurality of radial directions. The code disk comprises a plurality of disk sectors sequentially disposed in the circumferential direction around the center position, wherein each of the disk sectors comprises a plurality of code pieces, each of the code pieces comprises an encoded value, each of the encoded values comprises a plurality of bits adopting Manchester code, these bits are arranged in one of the radial directions, and the encoded values of two of the disk sectors are arranged as Gray code.

9 Claims, 11 Drawing Sheets

(56) References Cited

U.S. PATENT DOCUMENTS

| | | | |
|---|---|---|---|
| 5,418,362 A * | 5/1995 | Lusby | G01D 5/34792 250/231.18 |
| 5,917,182 A | 6/1999 | Ishizuka | |
| 6,154,278 A | 11/2000 | Ito et al. | |
| 6,577,985 B2 | 6/2003 | Scalf | |
| 6,588,333 B1 | 7/2003 | Homer et al. | |
| 6,654,128 B2 | 11/2003 | Takayama et al. | |
| 6,803,560 B1 | 10/2004 | Okumura et al. | |
| 6,898,744 B1 | 5/2005 | Jannotta | |
| 6,906,315 B2 | 6/2005 | Tobiason | |
| 7,102,123 B2 | 9/2006 | Chin et al. | |
| 7,309,855 B2 | 12/2007 | Nagasaka et al. | |
| 7,391,010 B2 | 6/2008 | Okada et al. | |
| 7,439,489 B2 | 10/2008 | Sasaki et al. | |
| 7,449,678 B2 | 11/2008 | Ito | |
| 7,550,710 B2 | 6/2009 | McAdam | |
| 7,612,327 B2 | 11/2009 | Okada | |
| 7,619,208 B2 | 11/2009 | Masada et al. | |
| 7,649,168 B2 | 1/2010 | Hane et al. | |
| 7,663,093 B2 | 2/2010 | Kusano | |
| 7,820,957 B2 | 10/2010 | Kimura et al. | |
| 7,825,368 B2 | 11/2010 | Kusano | |
| 7,907,286 B2 | 3/2011 | Holzapfel | |
| 7,939,795 B2 | 5/2011 | Powell | |
| 7,943,897 B2 | 5/2011 | Okada | |
| 8,141,265 B2 | 3/2012 | Ellin et al. | |
| 8,148,674 B2 | 4/2012 | Yoshida et al. | |
| 8,188,420 B2 | 5/2012 | Lee | |
| 8,188,421 B2 | 5/2012 | Hane | |
| 8,193,483 B2 | 6/2012 | Chin et al. | |
| 8,212,202 B2 | 7/2012 | Wong et al. | |
| 8,311,131 B2 | 11/2012 | Woyzichovski | |
| 8,330,098 B2 | 12/2012 | Thor et al. | |
| 8,492,703 B2 | 7/2013 | Tobiason et al. | |
| 8,546,743 B2 | 10/2013 | Fujita | |
| 8,546,744 B2 | 10/2013 | Yoshida et al. | |
| 8,610,050 B2 | 12/2013 | Yamamoto et al. | |
| 8,637,805 B2 | 1/2014 | Altendorf et al. | |
| 8,666,261 B2 | 3/2014 | Takahashi | |
| 8,674,287 B2 | 3/2014 | Yoshida et al. | |
| 8,742,321 B2 | 6/2014 | Koiso et al. | |
| 8,772,705 B2 | 7/2014 | Rai | |
| 8,835,832 B2 | 9/2014 | Chew et al. | |
| 8,847,144 B2 | 9/2014 | Soo et al. | |
| 8,896,821 B2 | 11/2014 | Miyajima et al. | |
| 8,933,392 B2 | 1/2015 | Harada | |
| 9,068,862 B2 | 6/2015 | Hopp et al. | |
| 9,488,502 B2 | 11/2016 | Chen et al. | |
| 2002/0111765 A1 | 8/2002 | Scalf | |
| 2005/0058352 A1 | 3/2005 | Deliwala | |
| 2006/0273931 A1 * | 12/2006 | Sano | G01D 5/34792 341/3 |
| 2009/0272884 A1 | 11/2009 | Toh et al. | |
| 2010/0140463 A1 | 6/2010 | Villaret | |
| 2013/0204574 A1 | 8/2013 | Agrawal et al. | |
| 2013/0242289 A1 | 9/2013 | Miyajima et al. | |
| 2017/0059367 A1 | 3/2017 | Goldman et al. | |
| 2018/0113008 A1 | 4/2018 | Chou et al. | |

FOREIGN PATENT DOCUMENTS

| | | |
|---|---|---|
| CN | 104515534 A | 4/2015 |
| CN | 107091655 A | 8/2017 |
| TW | I403699 B | 8/2013 |
| TW | I592637 B | 7/2017 |

OTHER PUBLICATIONS

Carr, J. et al., "Optical encoder readhead chip," 2008 2nd Electronics Systemintegration Technology Conference, Greenwich, UK, pp. 797-802 (Sep. 1-4, 2008).

K., J.M., et al., "Devising Simulink Optical Encoder Pulse Manipulation and its Evaluation," 2012 12th International Conference on Intelligent Systems Design and Applications (ISDA), pp. 640-644 (Nov. 27-29, 2012).

Liang, L., et al., "The design of composite optical encoder," The Ninth International Conference on Electronic Measurement & Instruments, ICEMI'2009, Beijing, China, pp. 2-642-2-245 (Aug. 16-19, 2009).

CN Office Action in Application No. 201811619528.1 dated Jul. 16, 2021.

* cited by examiner

|   | $S_1$ | $S_2$ | $S_3$ | $S_4$ | $S_5$ | $S_6$ | $S_7$ | $S_8$ | $S_9$ | $S_{10}$ |
|---|---|---|---|---|---|---|---|---|---|---|
| $T_{10}$ / $T_{10}'$ | 1 | 1 | 1 | 1 | 1 | 1 | 1 | 1 | 1 | 1 |
| $T_9$ / $T_9'$ | 0 | 1 | 1 | 1 | 1 | 1 | 1 | 1 | 1 | 1 |
| $T_8$ / $T_8'$ | 0 | 0 | 1 | 1 | 1 | 1 | 1 | 1 | 1 | 1 |
| $T_7$ / $T_7'$ | 0 | 0 | 0 | 1 | 1 | 1 | 1 | 1 | 1 | 1 |
| $T_6$ / $T_6'$ | 0 | 0 | 0 | 0 | 1 | 1 | 1 | 1 | 1 | 1 |
| $T_5$ / $T_5'$ | 0 | 0 | 0 | 0 | 0 | 1 | 1 | 1 | 1 | 1 |
| $T_4$ / $T_4'$ | 0 | 0 | 0 | 0 | 0 | 0 | 1 | 1 | 1 | 1 |
| $T_3$ / $T_3'$ | 0 | 0 | 0 | 0 | 0 | 0 | 0 | 1 | 1 | 1 |
| $T_2$ / $T_2'$ | 0 | 0 | 0 | 0 | 0 | 0 | 0 | 0 | 1 | 1 |
| $T_1$ / $T_1'$ | 0 | 0 | 0 | 0 | 0 | 0 | 0 | 0 | 0 | 1 |
| C / C' | 1 | 0 | 1 | 0 | 1 | 0 | 1 | 0 | 1 | 0 |

FIG. 3

CODE DISK, OPTICAL DETECTOR, OPTICAL ABSOLUTE ROTARY ENCODER AND ENCODED-VALUE-OUTPUTTING METHOD WITH ERROR DETECTION AND CORRECTION

CROSS-REFERENCE TO RELATED APPLICATIONS

This non-provisional application claims priority under 35 U.S.C. § 119(a) on Patent Application No(s). 107147145 filed in Taiwan, ROC on Dec. 26, 2018, the entire contents of which are hereby incorporated by reference.

BACKGROUND

1. Technical Field

This disclosure relates to an encoder and an encoded-value-outputting method with error detection and correction, and more particularly to an optical absolute rotary encoder and an encoded-value-outputting method with error detection and correction.

2. Related Art

The demand for global industrial automation is growing, and the demand for servo motors and precise positioning equipment is also increasing. The encoder, as a sensing module for positioning purposes, is widely used in machine tools, robots, and semiconductor devices. The accuracy of the encoder directly affects the positioning performance of the mechanical equipment.

However, when it comes to a code disk, the higher positioning accuracy means the smaller positioning width. In a practical implementation, the code disk is embedded in the motor and is susceptible to oil stains, which easily cause identification failures. The encoder must have a function in error detection and error correction to ensure that the code disk provides an accurate positioning signal when the code disk is stained, and will not output falsely due to oil stains, resulting in processing danger.

SUMMARY

According to one or more embodiment of this disclosure, an optical absolute rotary encoder comprising: a light source device configured to generate a light beam; a code disk configured to illuminated by the light source device and a part of the light beam penetrating the code disk, wherein the code disk is divided into a plurality of columns, with the plurality of columns disposed in a circumferential direction around a center position and respectively extending in a plurality of radial directions, with the code disk comprising: a plurality of disk sectors sequentially disposed in the circumferential direction around the center position, wherein each of the disk sectors comprises a plurality of code pieces, each of the code pieces comprises an encoded value, each of the encoded values comprises a plurality of bits adopting Manchester code, these bits are arranged in one of the radial directions, and the encoded values of two of the disk sectors are arranged as Gray code; an optical detector configured to receive the part of the light beam penetrating the code disk, wherein the code disk locates between the light source module and the optical detector and the optical detector comprises: a first detecting area comprising a plurality of first photosensor blocks arranged into two photosensor arrays along a first direction; a second detecting area comprising a plurality of second photosensor blocks, wherein a shape of each of the plurality of second photosensor blocks is a polygon; wherein the first direction is a radial direction with respect to a reference position; and a sensing circuit configured to perform an error-correcting procedure according to a determination result of whether the first and second code sets are arranged as Gray code for selectively outputting a location result, an error-reporting signal or a corrected location result, wherein the first and second code set are the two encoded values of two disk sectors specified by the part of the light beam penetrating the code disk by the two photosensor arrays.

According to one or more embodiment of this disclosure, a code disk adapted to an optical absolute rotary encoder, wherein the code disk is divided into a plurality of columns, with the plurality of columns disposed in a circumferential direction around a center position and respectively extending in a plurality of radial directions, with the code disk comprising: a plurality of disk sectors sequentially disposed in the circumferential direction around the center position, wherein each of the disk sectors comprises a plurality of code pieces, each of the code pieces comprises an encoded value, each of the encoded values comprises a plurality of bits adopting Manchester code, these bits are arranged in one of the radial directions, and the encoded values of two of the disk sectors are arranged as Gray code.

According to one or more embodiment of this disclosure, an optical detector adapted to a code disk comprising: a first detecting area comprising a plurality of first photosensor blocks arranged into two photosensor arrays along a first direction; a second detecting area comprising a plurality of second photosensor blocks, wherein a shape of each of the plurality of second photosensor blocks is a polygon; wherein the first direction is a radial direction with respect to a reference position.

According to one or more embodiment of this disclosure, an encoded-value-outputting method with error detection and correction, with the method adapted to an optical absolute rotary encoder to be illuminated by a light source, wherein the optical absolute rotary encoder comprises a code disk, a sensing circuit, and two photosensor arrays, with the method comprising: obtaining a first code set and a second code set respectively by the two photosensor arrays, wherein the first and second code sets are obtained from two disk sectors of the code disk illuminated by the light source; each of the first and second code sets comprises a plurality of encoded values, and the encoded values of the first code set and the encoded values of the second code set are arranged as Gray code; and outputting a location result, an error-reporting signal or a corrected location result selectively by the sensing circuit according to a determination result of whether the first and second code sets are arranged as Gray code.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 3 is a schematic diagram showing the code piece with its encoded values and the error detection piece with its encoded values;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
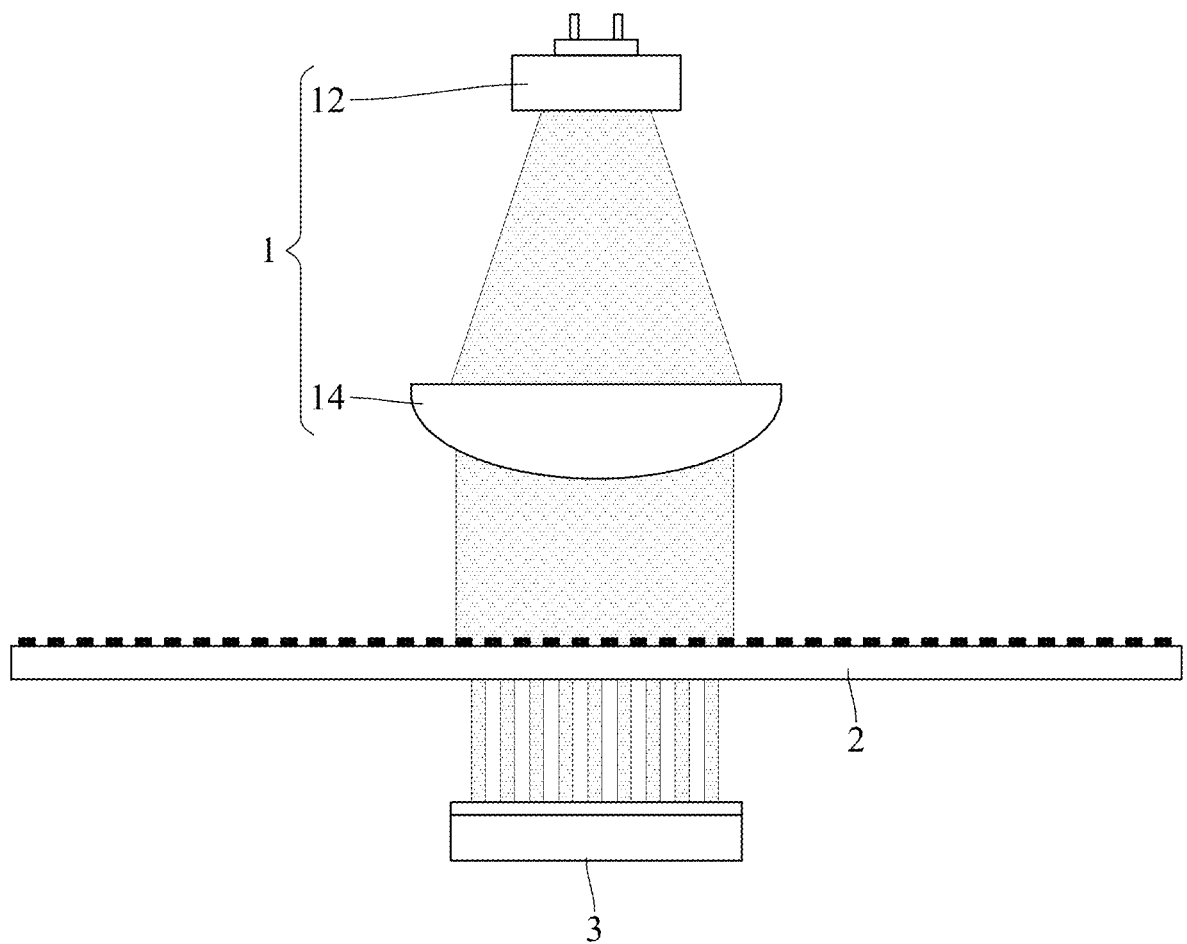
FIG. 1 is a side view of the optical absolute rotary encoder according to an embodiment of the present disclosure.

Please refer to FIG. 1. The optical absolute rotary encoder according to an embodiment of the present disclosure comprises a light source device 1, a code disk 2, an optical detector 3, and a sensing circuit 4 (not depicted). The encoded-value-outputting method of error detection and correction running on the sensing circuit and the above elements will be described in detail below.

Please refer to FIG. 1. The light source device 1 is configured to generate a light beam. The light source device 1 comprises a light source 12 and a lens 14. Practically, the light source 12 is such as an LED (Light-Emitting Diode), micro LED, or laser. The lens 14 is configured to convert the light beam emitted by the light source 12 into a near-parallel light field and project the light beam on the code disk 2 as shown in FIG. 1.

Figure 2:
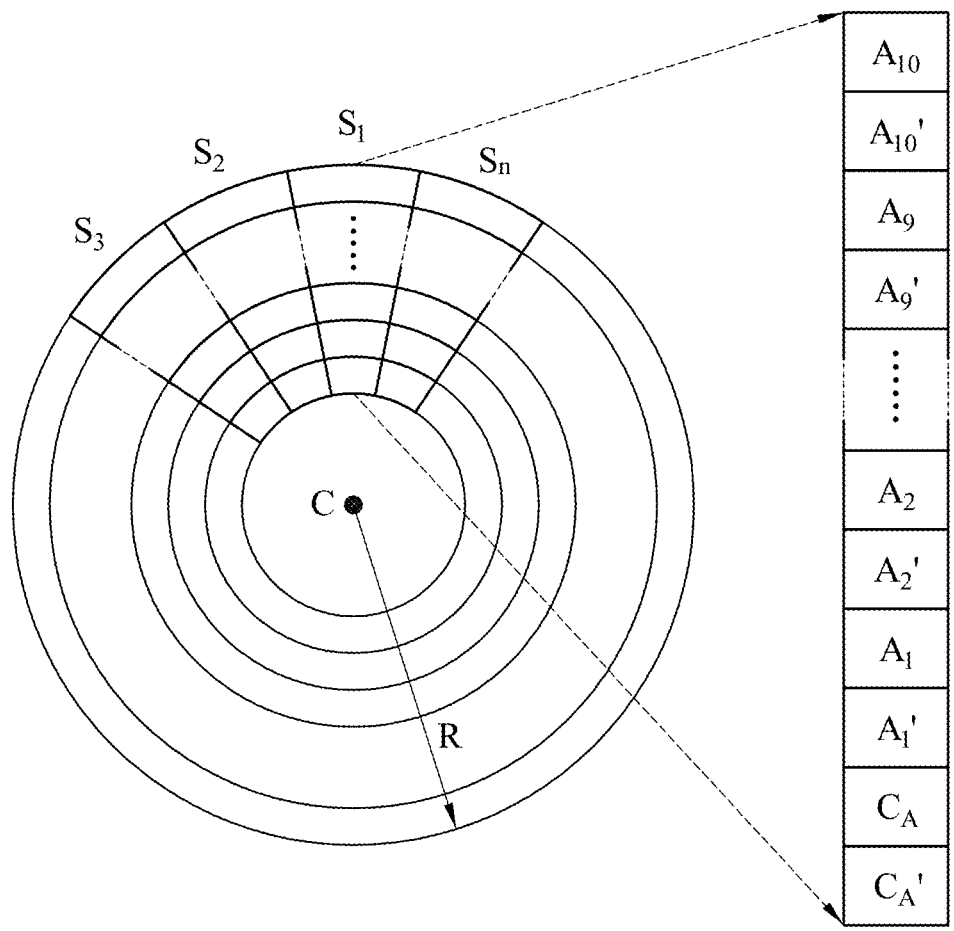
FIG. 2 is a schematic diagram of a code disk and a disk sector according to an embodiment of the present disclosure.

Please refer to FIG. 2, which illustrates a code disk 2 according to an embodiment of the present disclosure. The code disk 2 is illuminated by the light beam emitted by the light source device 1, and a part of the light beam transmits through a translucent of the code disk 2. As shown in FIG. 2, the code disk 2 is in a round shape with a center position C.

The code disk 2 comprises a plurality of disk sectors $S_1$ to $S_n$. These disk sectors $S_1$ to $S_n$ are sequentially disposed in the circumferential direction around the center position C. Each of the disk sectors comprises a plurality of code pieces and an error detection piece. Take the disk sector $S_1$ as an example. The disk sector $S_1$ comprises ten code pieces from $(A_1, A_1')$ to $(A_{10}, A_{10}')$ and the error detection piece $(C_A, C_A')$. Each of the code pieces comprises an encoded value, and each of the encoded values comprises a plurality of bits. These bits are sequentially arranged in one of the radial directions R. Take the code piece $(A_{10}, A_{10}')$ of the disk sector $S_1$ for example. $A_{10}$ is one bit and $A_{10}'$ is also one bit, so the code piece $(A_{10}, A_{10}')$ is two bits. In an embodiment of the present disclosure, these two bits adopt Manchester coding, that is, an encoded value of the code piece $(A_{10}, A_{10}')$ is represented by two bits with values opposite to each other. For example, when $A_{10}$ is 1 and $A_{10}'$ is 0, the encoded value of the code piece $(A_{10}, A_{10}')$ is 0. On the other hand, when $A_{10}$ is 0 and $A_{10}'$ is 1, the encoded value of the code piece $(A_{10}, A_{10}')$ is 1. The encoded value is determined based on a default direction. In the above example, the default direction is the radial direction R to the center, and the encoded value is determined as 0 if the two bits are (1, 0).

The translucent part of the code disk 2 represent the bit value of this area is 1. Take the previous example. The bit value of $A_{10}'$ is 0, which means the area of $A_{10}$ of the code disk 2 is translucent. On the other hand, when the bit value of $A_{10}'$ is 1, the area of $A_{10}'$ of the code disk 2 is opaque.

Please refer to FIG. 2. The plurality of code pieces $(A_1, A_1')$ to $(A_{10}, A_{10}')$ of each disk sector S1 are disposed in a radial direction R, and the two bits of each code piece are also disposed in the radial direction R.

Please refer to FIG. 2 and FIG. 3. The encoded value of the error detection piece $(C_A, C_A')$ also adopts Manchester coding, and is determined according to the encoded values of all code pieces $(A_1, A_1'), (A_2, A_2'), \ldots (A_{10}, A_{10}')$ of the disk sector $S_1$. Practically, the error detection piece adopts a parity bit but the present disclosure is not limited thereto. Please refer to FIG. 3. A plurality of disk sectors $S_1$ to $S_{10}$ are illustrated in FIG. 3. The plurality of code pieces of each of the disk sectors occupy a plurality of rows of the code disk 2 respectively. Each row is equivalent to a track of the code disk 2. From a view from row $T_{10}$ to row $T_1$, the disk sector $S_1$ comprises ten encoded values "1000000000". Since the number of encoded value "1" is odd, the encoded value of the error detection piece (C, C') of the disk sector $S_1$ is 1. Similarly, since the number of encoded value "1" of the disk sector $S_2$ is even, the encoded value of the error detection piece (C, C') of the disk sector $S_2$ is 0. The purpose of the aforementioned encoding manner is to detect whether each code piece will output an error encoded value due to stain or corrosion. Normally, the code piece should be a combination consisting of a single bit 0 and a single bit 1. However, an error condition may occur to a certain code piece, such as (A1, A1'). If the code piece is stained by oil or gas and the area where the light should be transmitted is changed to opaque, the bits (0, 0) will be returned. Similarly, if the code piece is corroded and the original opaque area becomes translucent, the bits (1, 1) will be returned. Since both of the code pieces of (0, 0) and (1, 1) are surly wrong in Manchester coding, that is, there must be an error in one of the encoded values of either (0, 0) or (1, 1) the error detecting effect can be achieved.

Please refer to FIG. 3. In an arrangement of the encoded values of the code disk 2 according to an embodiment of the present disclosure, the encoded values of two adjacent disk sectors only differ in one encoded value. In other words, encoded values of two adjacent disk sectors conform to a property of Gray code. For example, the encoded values of disk sector $S_1$ and the encoded values of disk sector $S_2$ has a different encoded value at row ($T_9$, $T_9'$), and the different encoded value of disk sector $S_5$ and $S_6$ locates in row ($T_5$, $T_5'$).

Figure 4A:
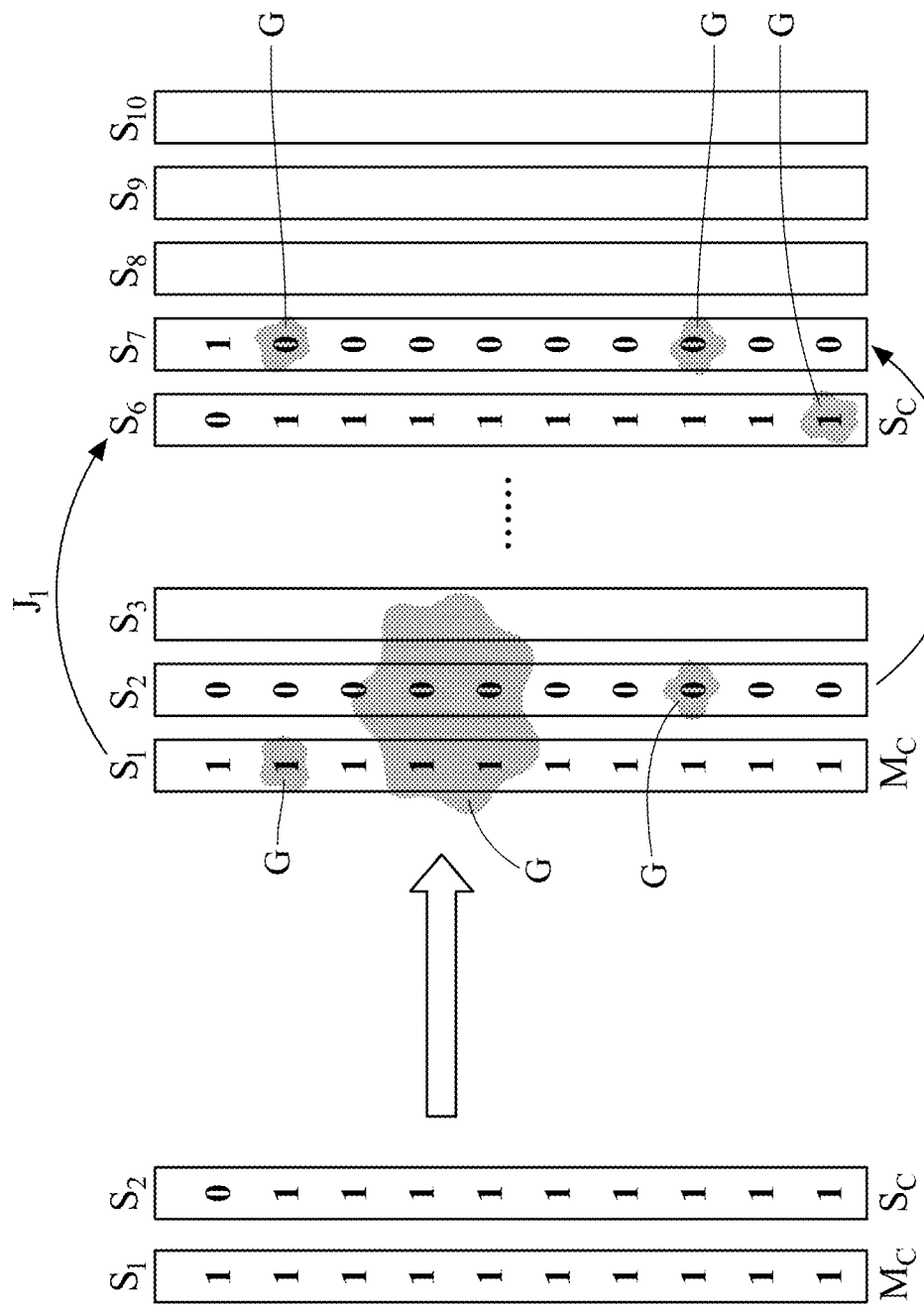
FIG. 4A is a schematic diagram of the arrangements of the master column and the slave column before and after the column-skipping encoding.

Please refer to FIG. 4A, which illustrates a column-skipping encoding according to an embodiment of the present disclosure. It should be noticed in advance that the present disclosure applies an optical detector 3 to read encoded values respectively from two disk sectors for performing the encoded-value-outputting method of error detection and correction. Every time the code disk 2 rotates for a specified angle, the optical detector 3 can scan two disk sectors, which will be referred to as the main column and the slave column in the following descriptions. The encoded values of the master column and the encoded values of the slave column are respectively referred to as the first code set and the second code set. Please refer to FIG. 2 and FIG. 4A together. The master column $M_C$ locates in a disk sector $S_1$, and the slave column $S_C$ locates in another disk sector $S_2$. As for the column-skipping mechanism, among these disk sectors sequentially disposed at the code disk 2 along the circumferential direction, two disk sectors (i.e., the master column $M_C$ and the slave column $S_C$ described previously) arranged as Gray code are spaced by a sequential difference in the circumferential direction, and this sequential difference is greater than or equal to 2. In an embodiment of the present disclosure, this sequential difference is 4 as an example. It should be noticed that the sequential difference can also be 0 or 1 in practical application. For example, the master column $M_C$ and the slave column $S_C$ next to each other are illustrated in the left side of FIG. 4A. However, in a practical implementation of code disk 2, the slave column $S_C$ is arranged at the position of the disk sector $S_6$ when the main column $M_C$ locates in the disk sector $S_1$. As indicated by an arrow $J_1$ on the right side of FIG. 4A, the sequential difference between the main column $M_C$ and the slave column $S_C$ is set as 4. Thus, when the code disk 2 rotates so that a new master column $M_C$ belonging to the disk sector $S_2$ is scanned by the optical detector 3, the corresponding slave column $S_C$ belongs to the disk sector $S_7$ as indicated by an arrow $J_2$ on the right side of FIG. 4A. According to the column-skipping encoding described previously, it can reduce the probability that the master column $M_C$ and the slave column $S_C$ are simultaneously stained by the oil G having a certain area, thereby it can reduce the probability that the sensing circuit of the encoder cannot output the correct absolute position.

Figure 4B:
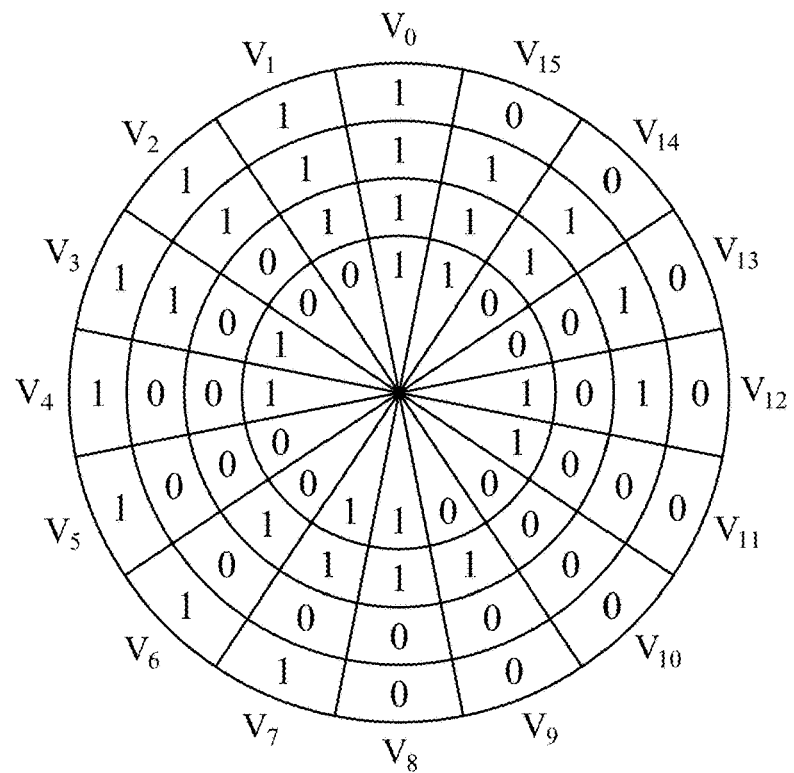
FIG. 4B is a code disk without the column-skipping encoding.
Figure 4C:
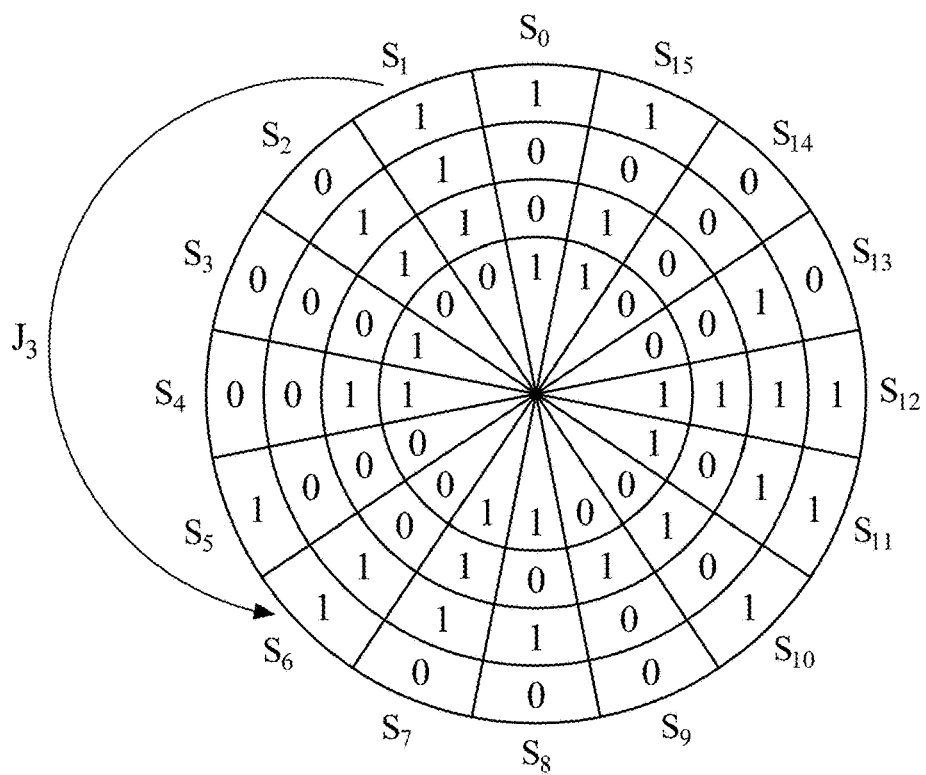
FIG. 4C is an example of the small-sized code disk adopting the column-skipping encoding according to an embodiment of the present disclosure.

Please refer to FIG. 4B and FIG. 4C together. FIG. 4B illustrates a small-sized code disk whose encoded values of every two adjacent disk sectors are arranged as Gray code, as what is shown in FIG. 4C. FIG. 4C illustrates an example of presenting encoded values of all disk sectors in a small-sized code disk according to the aforementioned column-skipping mechanism. As shown in FIG. 4C, this code disk comprises 16 disk sectors, and the serial number $S_0$ to $S_{15}$ of each disk sector are indicated on the periphery of the code disk. The encoded values of every master column $M_C$ and its corresponding slave column $S_C$ are arranged as Gray code in the code disk 2 according to an embodiment of the present disclosure. For example, in FIG. 4C, assuming the master column $M_C$ currently belongs to the disk sector $S_1$, the position of corresponding slave column $S_C$ is disk sector $S_6$ indicated by the arrow $J_3$. The encoded values "1110" of the master column $M_C$ and the encoded values "1100" of the slave column $S_C$ differ in only 1 bit, and this conforms to the rule of Gray code.

Figure 5:
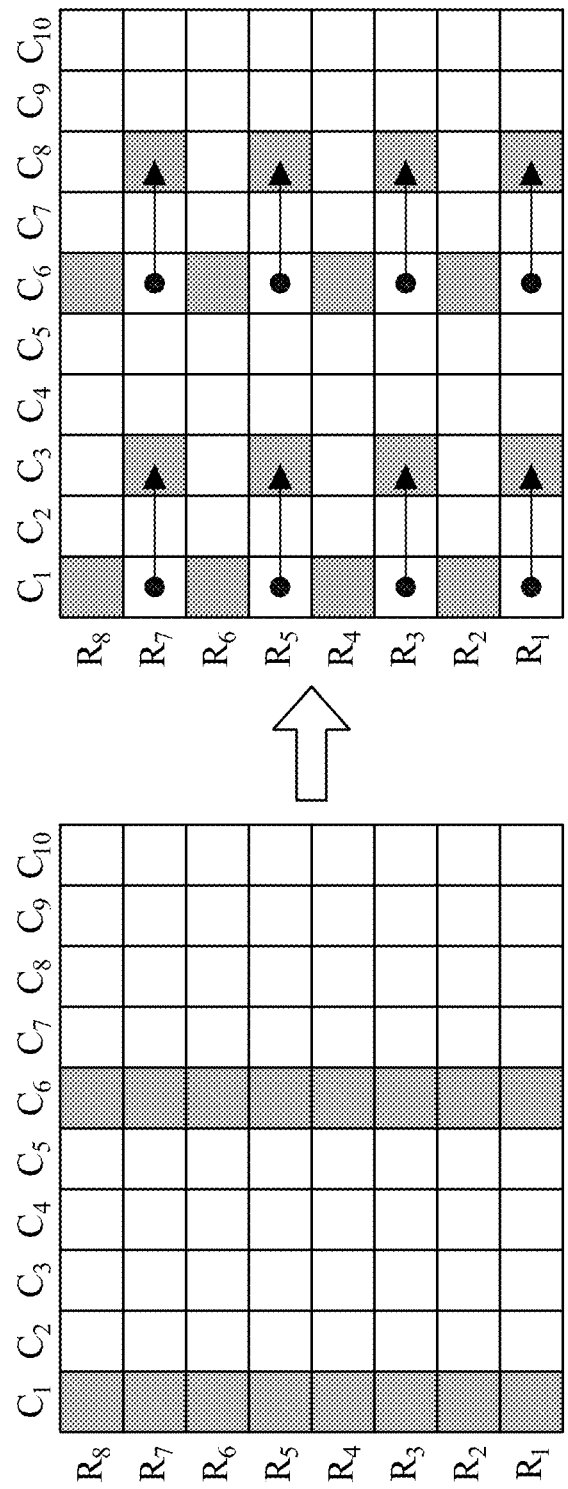
FIG. 5 is a schematic diagram of the arrangements of the master column and the slave column before and after the interlaced arrangement according to an embodiment of the present disclosure.

Please refer to FIG. 5, which illustrates an example of the interlaced arrangement on the code disk according to an embodiment of the present disclosure. Two disk sectors locating in column $C_1$ and column $C_6$ are illustrated at the left side of FIG. 5. Regarding a plurality of code pieces in column $C_1$, the interlaced arrangement is to shift the code pieces located in the odd-numbered columns $R_1$, $R_3$, $R_5$, and $R_7$ into the same row of the column $C_3$ and to keep still the coding pieces in the even-numbered columns $R_2$, $R_4$, $R_6$, and $R_8$. The shifting operation spaces one column C2 out. For the same reason, regarding column C6, only the code pieces located in the odd-numbered columns $R_1$, $R_3$, $R_5$, and $R_7$ are shifted into the same row of column $C_8$. It should be noted that the present disclosure does not specifically limit which rows in the same column may be shifted, the number of columns to be spaced, the start and end position to be in the same row. The interlaced arrangement described above can arrange the coding pieces of each disk sector into a plurality of columns. Therefore, it reduces the probability that one oil spot stains plural coding pieces of one disk sector and thus causes the encoded values thereof to be unrecognizable or undetectable. In addition, the design of interlaced arrangement may be applied a larger area of a photosensitive element and facilitate the routing of adjacent photosensitive elements, as compared to a design in which all coding pieces of a disk sector are arranged in a single column. The details of the above effects will be described later.

Figure 6A:
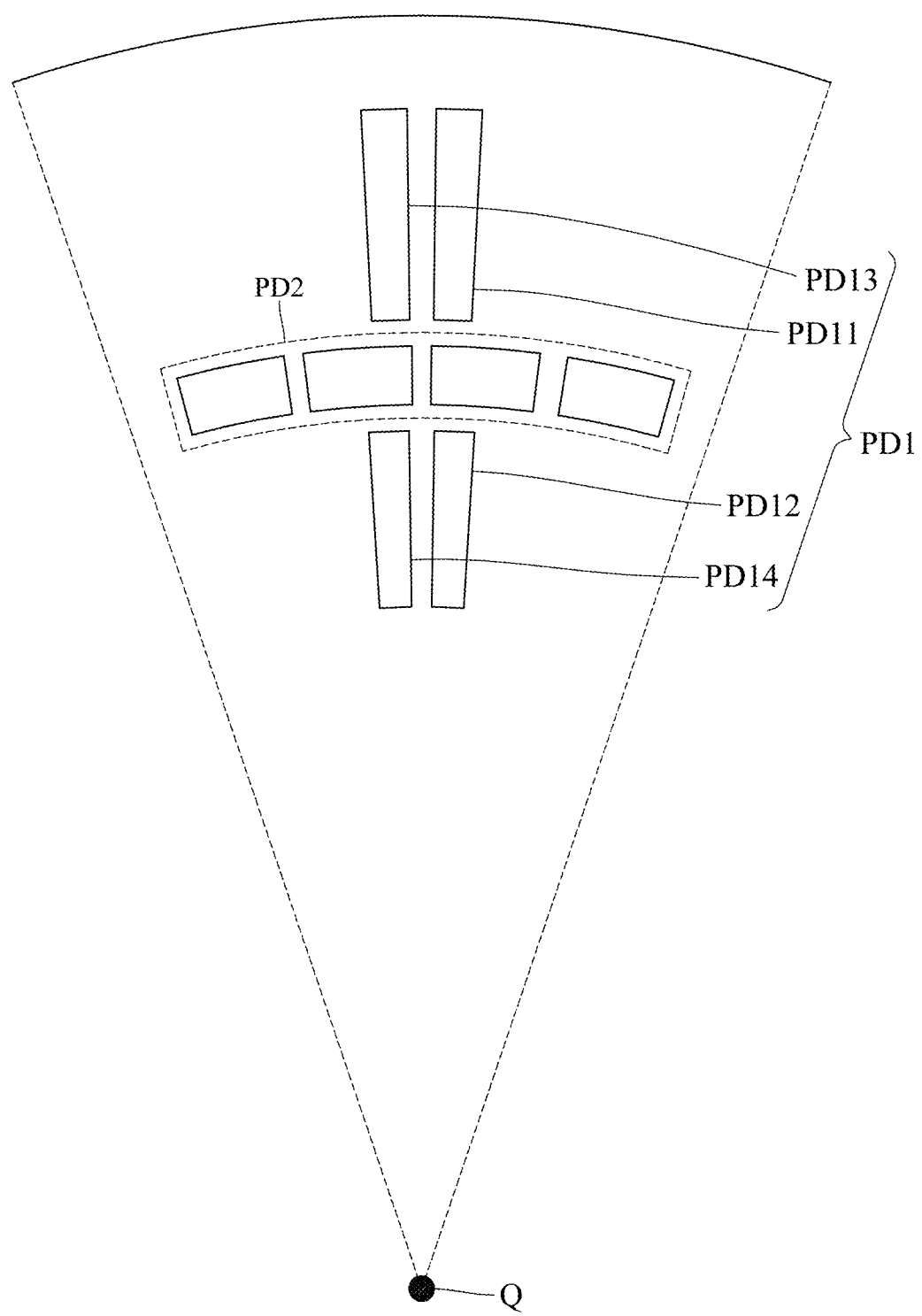
FIG. 6A is a schematic diagram of the relative position of the first and second detecting area according to an embodiment of the present disclosure.

Please refer to FIG. 6A, which illustrates a schematic diagram of the optical detector 3 according to an embodiment of the present disclosure. The optical detector 3 is adapted to be disposed adjacent to the aforementioned code disk 2, and thereby detecting a light beam transmitted through the code disk 2 and converting it into an electronic signal. As shown in FIG. 6A, the optical detector 3 comprises a first detecting area PD1 and a second detecting area PD2. Structurally, the optical detector 3 has a reference position Q, and the first detecting area PD1 and the second detecting area PD2 are individually disposed to surround the periphery of the reference position Q. The first detecting area PD1 and the second detecting area PD2 are preferably to be disposed in a centered of sector range on the reference position Q. The relative positional relationship and composition of the two detecting areas PD1 and PD2 will be described below.

Please refer to FIG. 6A. The first detecting area PD1 comprises two photosensor arrays, and they are photosensor array (PD11, PD12) and photosensor array (PD13, PD14). The two photosensor arrays are disposed in a peripheral direction around the reference position Q and are spaced by an interval. The interval of the two photosensor arrays corresponds to the sequential difference of disk sectors of the code disk 2 in the circumferential direction thereof. In an example illustrated in FIG. 6A, the first detecting area PD1 comprises an outer track area (PD11, PD13) and an inner track area (PD12, PD14), and the second detecting area PD2 is between the outer track area (PD11, PD13) and the inner track area (PD12, PD14). Practically, an interval between the second detecting area PD2 and the outer/inner track area in the radial direction of the reference position Q is, for example, 265 to 275 micrometers, 295 to 305 micrometers, or 325 to 335 micrometers. However, this interval may be 0 micrometer in practical application. The width of this interval is under the consideration of a tolerance of alignment assembly. However, the arrangement example illustrated in FIG. 6A is not a limitation of the relative position of the first detecting area PD1 and the second detecting area PD2. In addition, the first detecting area PD1 may only dispose the outer track area (PD11, PD13) without providing the inner track area (PD12, PD14) and vice versa. The present disclosure is not limited thereto.

Figure 6B:
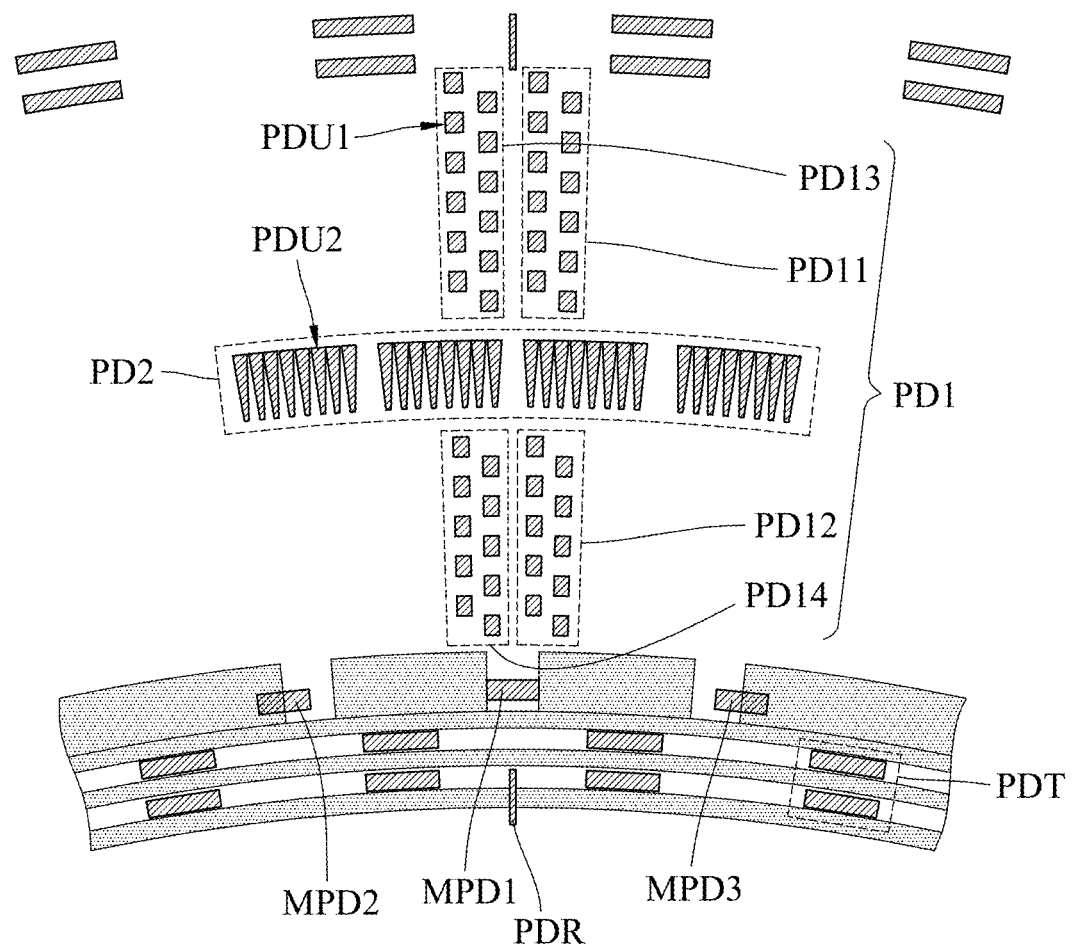
FIG. 6B is a schematic diagram of the first and second photosensor blocks according to an embodiment of the present disclosure.

Please refer to FIG. 6A and FIG. 6B together. FIG. 6B illustrates a schematic diagram of details of the first detecting area PD1 and the second detecting area PD2 according to an embodiment of the present disclosure. The two photosensor arrays (PD11, PD12) and (PD13, PD14) of the first detecting area PD1 are respectively consisted of a plurality of first photosensor blocks PDU1. The plurality of the first photosensor blocks PDU1 of each photosensor array are arranged in a radial direction with respect to the reference position Q. The radial direction with respect to the reference position Q is the direction of the radial positioning line PDR illustrated in FIG. 6B, and is referred to as the first direction in later description. Further, the peripheral direction around the reference position Q is the direction of the tangential positioning line PDT illustrated in FIG. 6B, and is referred to as the second direction in later description, while the second direction is perpendicular to the first direction. Practically, in order to cooperate with the code disk 2, which adopts the column-skipping encoding to arrange the plurality of coding pieces as shown in FIG. 4A, the two photosensor arrays (PD11, PD12) and (PD13, PD14) are arranged in an identical way for respectively detecting encoded values of the master column $M_C$ and the slave column $S_C$.

Please refer to the interlaced arrangement of the code pieces at the right side of FIG. 5 and two photosensor arrays (PD11, PD12) and (PD13, PD14), of FIG. 6B. Practically, the two photosensor arrays (PD11, PD12) and (PD13, PD14) of the first detecting area PD1 are further arranged in a way which is consistent to the interlaced arrangement of the code disk 2. Therefore, in FIG. 6B, the encoded values of 12 code pieces may be detected by PD11 or PD13 locating in the outer track area, and the encoded values of 10 code pieces may be detected by PD12 or PD14 locating in the inner track area. Assuming that the photosensor array (PD13, PD14) is configured to detect the encoded values of the master column $M_C$, the photosensor array (PD11, PD12) is configured to detect the encoded values of the slave column $S_C$, and the encoded value of each code piece is one bit, the positioning accuracy of each photosensor array is 20 bits (The parity check for error detecting uses 2 bits which are not included in the positioning accuracy).

Practically, the disk sectors of the code disk 2 can be divided into a first encoding area and a second encoding area. The first detecting area PD1 and the first encoding area form an absolute digital encoding area, which is responsible for initial positioning accuracy. The second detecting area PD2 and the second encoding area form a fine adjustment segmentation, which is responsible for higher positioning accuracy under the decoding of the absolute digital encoding area. The size of the second encoding area and the second detecting area mainly adopts a radian of the minimum accuracy of the absolute digital encoding area as the radian of analog fine segmentation. A sine wave signal with a fixed-cycle is generated by the light and dark signals generated by the second encoding area and the second detecting area PD2. Further, a signal with higher positioning accuracy is parsed through the decoding of fine segmentation.

Practically, the plurality of first photosensor blocks PDU1 of the first detecting area PD1 may be implemented in two ways shown as follows.

In the first implementation, each of the first photosensor blocks PDU1 adopts a photosensitive element, such as a photodiode, but the present disclosure is not limited to the hardware. In the first direction, the length of each photodiode of the outer track area and the inner track area is 175 to 185 micrometers, and the size is determined according to a coverage area of the light source device 1 and the diameter of the code disk 2. In the second direction, the width of each photodiode of the outer track area is 143 to 155 micrometers, and the width of each photodiode of the inner track area is 125 to 135 micrometers. The photodiode array (PD array) of the outer track area has 12 rows, and the photodiode array (PD array) of the inner track area has 10 rows. Therefore, the first detecting area PD1 needs to use 44 photodiodes as shown in FIG. 6B.

The second implementation adopts a large-sized photosensitive element as the optical detector 3, and specifies certain areas therein as the first photosensor blocks PDU1. Practically, the large-sized photosensitive element may adopt a photodiode. In the first direction, the length of the outer track area of the photodiode may be 2155-2165 micrometers and the length of the inner track area may be 1795 to 1805 micrometers.

Please refer to FIG. 6B. The third detecting area comprises a plurality of photosensor blocks MPD1, MPD2, and MPD3. These photosensor blocks MPD1, MPD2, and MPD3 are configured to detect the rotational direction and the number of turns of the code disk 2. In FIG. 6B, the dotted part around the photosensor blocks MPD1 to MPD3 represents the opaque area of the code disk 2, and the blank part represents the translucent area of the code disk 2. For example, the photosensor block MPD2 in FIG. 6B is in a condition that the left area is not sensitive while the right area is sensitive.

In an embodiment, the number of turns of the code disk 2 can be detected by using a single photosensor block MPD1 and the code disk 2 with translucent area that the light beam can penetrate therethrough at a particular angle. For example, the photosensor block MPD1 is fully illuminated when it passes the twelve o'clock position of the code disk 2. The photosensor block MPD1 is not fully illuminated when it does not pass the twelve o'clock position of the code disk 2.

In another embodiment, the third detecting area of the optical detector 3 may have two photosensor blocks MPD1 and MPD2 and the rotational direction of the code disk 2 may be determined by a brightness (an energy of received light) relationship between MPD1 and MPD2. For example, MPD1 is fully illuminated and MPD2 is partially illuminated when facing the twelve o'clock position of the code disk 2. MPD1 is partially illuminated and MPD2 is fully illuminated when facing the left side of the twelve o'clock position of the code disk 2. MPD1 is partially illuminated and MPD2 is not illuminated when facing the right side of the twelve o'clock position of the code disk 2.

In further another embodiment, the third detecting area of the optical detector 3 can have three photosensor blocks MPD1, MPD2, and MPD3 for increasing the accuracy and speed of detection. For example, MPD1 is fully illuminated, MPD2 is partially illuminated, and MPD3 is partially illuminated when facing the twelve o'clock position of the code disk 2. MPD1 is partially illuminated, MPD2 is fully illuminated, and MPD3 is not illuminated when facing the left side of the twelve o'clock position of the code disk 2. MPD1 is partially illuminated, MPD2 is not illuminated, and MPD3 is fully illuminated when facing the right side of the twelve o'clock position of the code disk 2.

The detection accuracy and the determination speed can be improved when counting the number of turns of the code disk 2 and determining the rotational direction according to the design of the plurality of photosensor blocks MPD1 to MPD3 of the third detecting area.

Figure 7:
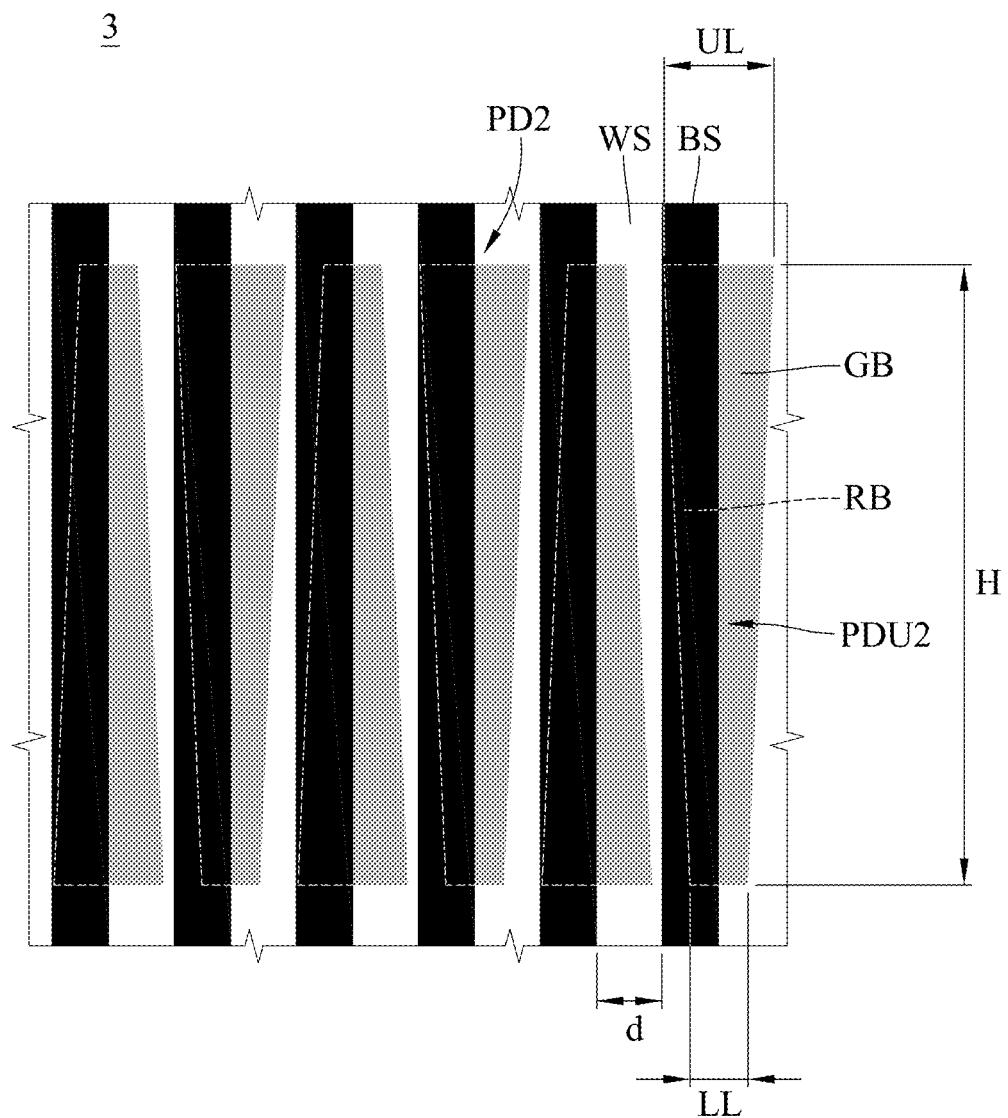
FIG. 7 is a schematic diagram of the second photosensor blocks concealed by the code disk according to an embodiment of the present disclosure.

Please refer to FIG. 6B and FIG. 7. The second detecting area PD2 comprises a plurality of second photosensor blocks PDU2 separately arranged in a second direction. Each of the second photosensor blocks PDU2 is a polygon such as a trapezoid whose upper parallel side and lower parallel side differ in length. Please refer to FIG. 6C. Practically, the light source device 1 generates a near-parallel light field, which is emitted to the trapezoidal second photosensor blocks PDU2 through the rectangular encoding stripes on the code disk 2. The second detecting area PD2 is a side-by-side arrangement of the plurality of second photosensor blocks PDU2 on the electrical connection, thereby increasing the overall intensity of received light.

Please refer to FIG. 7. The black block in FIG. 7 is an opaque section BS of the encoded stripe and the white part is a translucent section WS. The overlapped portion of the translucent section WS and the second photosensor block PDU2 is indicated as block GB in FIG. 7 and is a portion of the second photosensor blocks PDU2 that actually receives the light. On the other hand, the block RB is a portion of the second photosensor block PDU2 that does not receive the light because of the shelter of opaque area BS.

Practically, regarding the photosensor block PDU and the translucent section WS of the code disk 2, the shape of PDU and WS may be a combination of a polygon and rectangular. For example, the photosensor block PDU is the polygon and the translucent section WS is the rectangular, or the photosensor block PDU is the rectangular and the translucent section WS is the polygon. The present disclosure is not limited the shape of the photosensor block PDU and the translucent section WS.

Ideally, the energy of received light of each second photosensor block PDU2 is a sine wave pattern. The energy of received light is still a sine wave pattern when the plurality of second photosensor blocks PDU2 are arranged side by side to form the second detecting area PD2. In general, the installation space of the second detecting area PD2 can be divided into two sections having a phase difference of 90 degrees on the signal clock, wherein the signal of one section is called sine signal and the signal of another section is called cosine signal. By synthesizing the two sine wave signals into a Lissajous circle, the signal analysis of the second detecting area PD2 can be changed from a single sine wave to an angle analysis of a circle, wherein each signal, such as the sine signal, can be further divided into a sin+ signal and a sin− signal having a phase difference of 180 degrees from each other, and the differential circuit is used to increase the signal-to-noise ratio of the signal.

Please refer to FIG. 7. During a rotation of the code disk 2, the second photosensor block PDU2 receives the light beam emitted from the light source device 1 from a gap formed by the spacing d of the two stripes, and generates a corresponding electrical signal. Practically, the second photosensor block PDU2 is a trapezoidal shape, wherein the upper side UL of its parallel side is 125-135 micrometers, the lower side LL of them is 35 to 45 micrometers, and its height H is 595 to 605 micrometers. The spacing d between every two opaque sections BS, that is, the width of the translucent section WS, is 40 to 50 micrometers. However, this width is determined according to radian's value, and the present disclosure is not limited to the above numeric ranges.

Figure 8A:
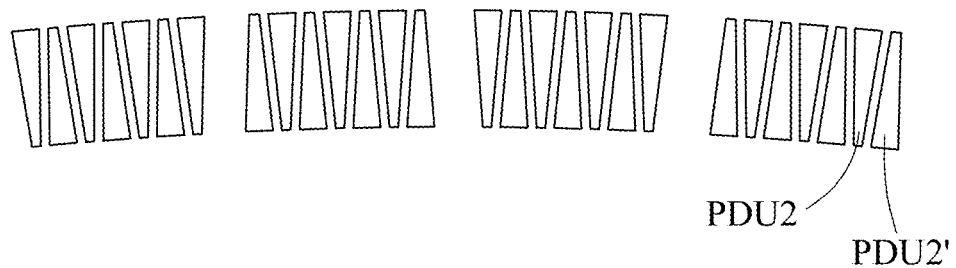
FIG. 8A is a schematic diagram of an arrangement of the second photosensor blocks according to an embodiment of the present disclosure.
Figure 8B:
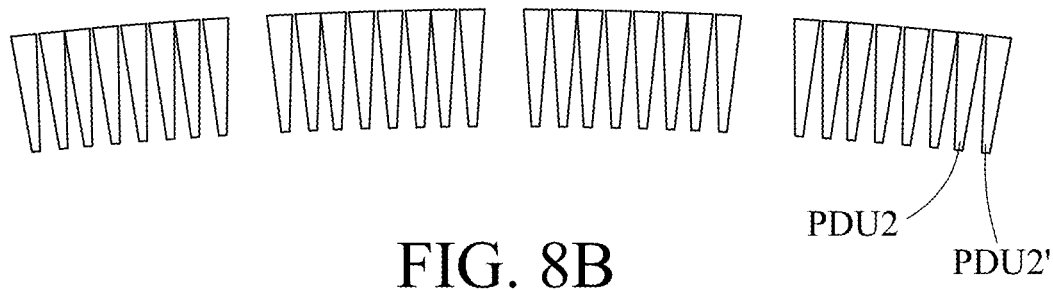
FIG. 8B is a schematic diagram of another arrangement of the second photosensor blocks according to an embodiment of the present disclosure.
Figure 8C:
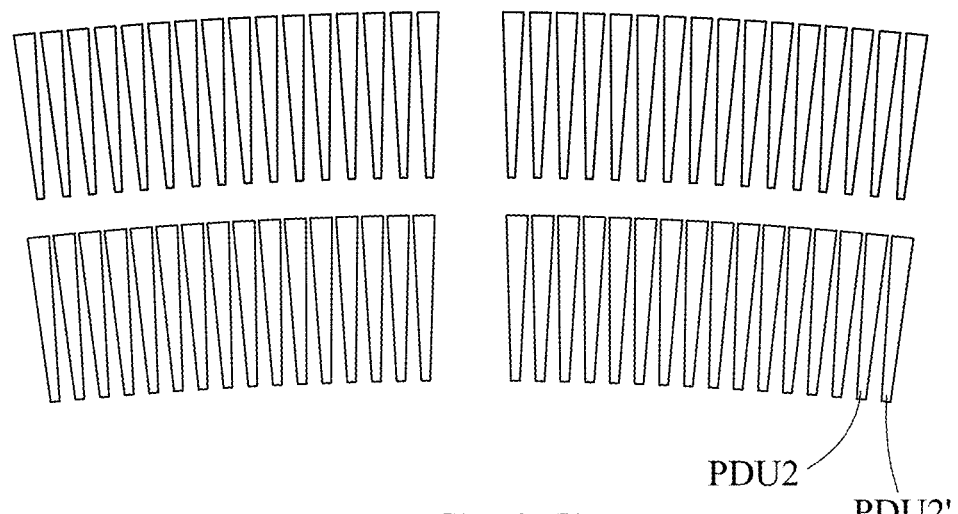
FIG. 8C is a schematic diagram of further another arrangement of the second photosensor blocks according to an embodiment of the present disclosure.

Please refer to FIG. 8A to FIG. 8C, which illustrate three examples of the second detecting area PD2 composed of the second photosensor blocks PDU2. In an embodiment of FIG. 8A, the upper parallel side of the trapezoid of the second photosensor block PDU2 and the lower parallel side of another adjacent trapezoid of the second photosensor block PDU2' are equidistant from the reference position Q, wherein the reference position R is, for example, corresponding to the center position C of the code disk 2. As seen from FIG. 8A, the adjacent two trapezoids are arranged in the same row in a way that one of them is upside down. Further, this embodiment adopts 7 second photosensor blocks PDU2 as a group and the four groups are disposed to serve as the second detecting area PD2. The spacing between the groups may not be equal, which are mainly determined by the required phase difference of sin (sine) and cos (cosine), wherein sin and cos are 90 degrees apart, sin+ and sin− are 180 degrees apart, and cos+ and cos− are 180 degrees apart. Taking FIG. 8A and FIG. 8B as examples, the four groups from left to right are sin+, cos+, cos−, and sin−, respectively, and three spacings corresponding to the four groups are 1.25 times, 1.5 times, and 1.75 times of the radian distance. This distance is the thinnest angle unit of absolute accuracy, and the arc length value calculated according to the radius length of the position is practically about 134.285 to 143.285 micrometers. This distance is the radian in the second direction of the middle position of the fine segmentation, and is the total width of the encoding stripe BS+WS of the fine segmentation.

In the embodiments of FIG. 8B and FIG. 8C, two upper parallel sides of every two adjacent trapezoids of the second photosensor blocks PDU2, PDU2' are equidistant from the reference position Q. In other words, the longer and upper side UL of the adjacent two trapezoids are aligned with each other and are arranged side by side in the same row (as shown in FIG. 8B) or in two rows (FIG. 8C). When the trapezoids are arranged in the same row, the second detecting area PD2 have 4 groups of the second photosensor blocks, and the spacings between the groups may not be equal, like the embodiment shown in FIG. 8A. When the trapezoids are arranged in two rows, a 2-by-2 array structure may be employed as the second detecting area PD2.

Regarding the implementation of the optical detector 3, there is an additional way that all of the first photosensor blocks PDU1 and the second photosensor blocks PDU2 may be disposed in different specified areas of the same photodiode. The length of this photodiode is 5050 to 5150 micrometer in the first direction, and the width is 4500 to 4600 micrometers in the second direction.

Figure 9:
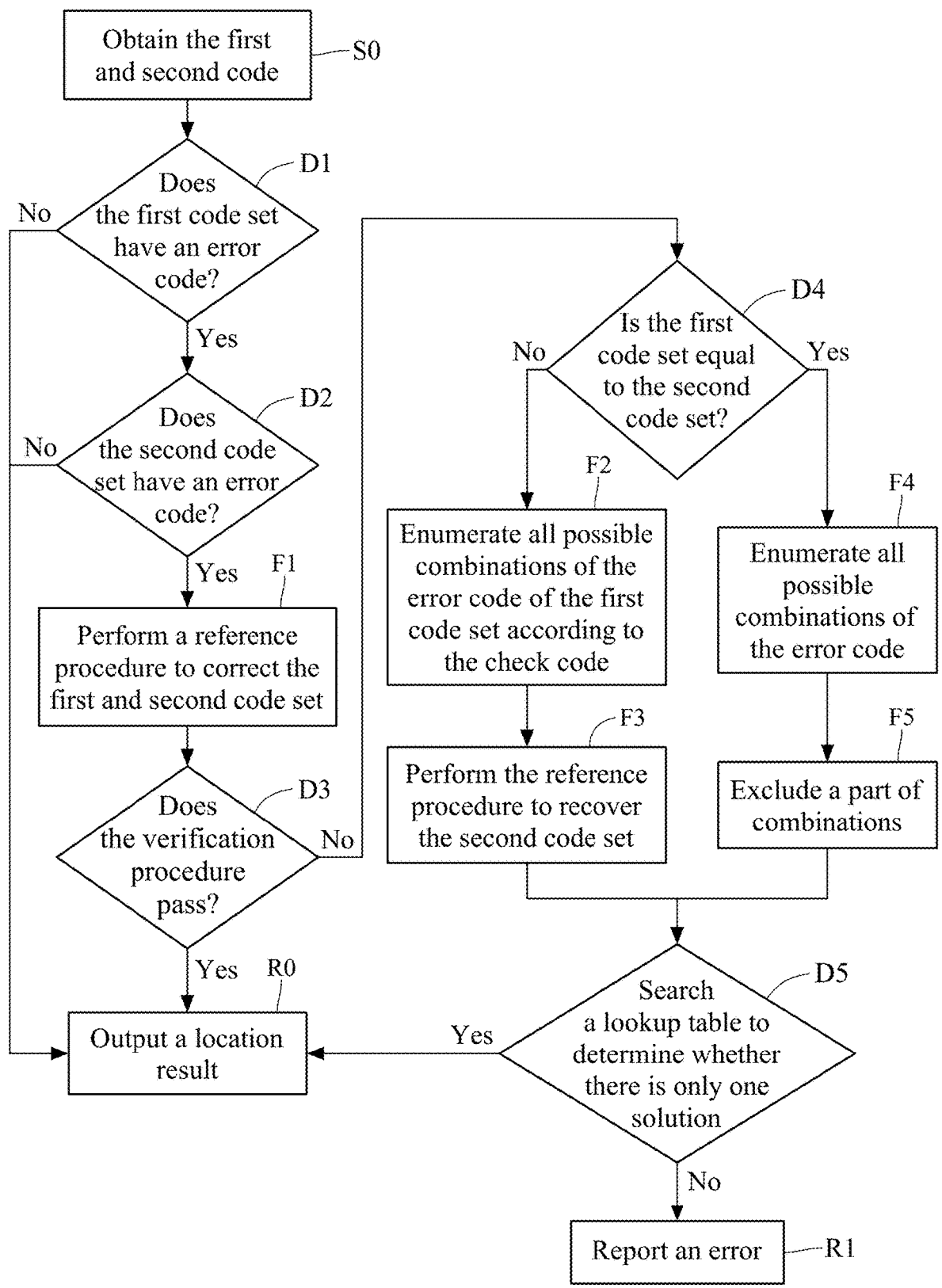
FIG. 9 is a flowchart of the encoded-value-outputting method of error detection and correction according to an embodiment of the present disclosure.

Please refer to FIG. 9, which illustrates the encoded-value-outputting method of error detection and correction, with the method adapted to an optical absolute rotary encoder to be illuminated by the light source device 1. The optical absolute rotary encoder comprises a code disk 2, a sensing circuit, and two photosensor arrays, wherein the method uses the plurality of first photosensor blocks PDU1 of the first detecting area PD1 of the optical detector 3, with the first photosensor blocks PDU1 arranged in two photosensor arrays (PD11, PD12), (PD13, PD14). Each step of the method will be traversed and detailed in accordance with the flowchart illustrated in FIG. 9.

Please refer to step S0, obtaining the first and second code sets. Specifically, the sensing circuit uses the two photosensor arrays (PD11, PD12), (PD13, PD14) to obtain the first and second code sets generated by the two code pieces (such as $M_C$ and $S_C$ as shown in FIG. 4A) of the code disk 2 after the illumination of the light source device 1. The first and second code sets respectively comprise a plurality of encoded values and a check code, with numbers of the encoded values of the first and second code sets identical to each other and with the encoded values of the first code set corresponding to the encoded values of the second code set respectively. The two code pieces of the code disk 2 are arranged as Gray code, that is, the plurality of encoded values of the two code sets differ in only one encoded value. The first code set is the encoded values of the aforementioned master column $M_C$, for representing an absolute position of the code disk 2. The second code set is the encoded values of the aforementioned slave column $S_C$, for representing another absolute position of the code disk 2. The two absolute positions described above have a fixed sequential difference on the code disk 2. Practically, the encoded values of the master column $M_C$ may be served as the second code set and the encoded values of the slave column $S_C$ may be served as the first code set, or the first code set is either master column $M_C$ or the slave column $S_C$ which has less errors, and the present disclosure is not limited thereto. The one-to-one correspondence means that the two encoded values on the same track of the code disk 2 correspond to each other, with the two encoded values belong to the first code set and the second code set respectively. The first and second code set should be arranged as Gray code under an unstained condition, that is, the encoded values of the two code sets differ in only one bit, and the rest of the encoded values of the first code set are all the same to the rest of the encoded values of the second code set. In addition, the check code is such as parity bit, but the present disclosure is not limited thereto.

Please refer to step D1. The sensing circuit determines whether the first code set includes an error code. Specifically, the sensing circuit check the two bits of each encoded value according to Manchester coding. In a normal condition, there are only two reasonable combinations of the two bits, one combination is (1, 0), representing the encoded value of 0, and another combination is (0, 1), representing the encoded value of 1. If the sensing circuit reads (0, 0), it means that the position of the bit value 1 in the code piece of the code disk 2 may be contaminated by oil, so that the position is changed from translucent (bit value is 1) to opaque (bit value is 0). If the sensing circuit reads (1, 1), it means that the position of the bit value 0 in the code piece of the code disk 2 may be corroded by the corrosive liquid, so that the position is changed from opaque (bit value is 0) to translucent (bit value is 1).

Please refer to step R0. If the first code set does not have any error code, the method of the present disclosure proceeds from step D1 to this step R0. The sensing circuit may directly output the positioning result according to the encoded values of the first code set. Practically, the sensing circuit may also selectively output the positioning result under the condition that both of the first and second code sets do not have any error code or have no error code after being corrected, and the present disclosure is not limited thereto.

If the sensing circuit finds that the first code set includes the error code in step D1, the next step is step D2 and the sensing circuit checks whether the second code set has any error code. If the second code set does not have any error code, the sensing circuit may directly output the positioning result according to the encoded values of the second code set.

As described above, if any of the first or second code set does not have any error code, the sensing circuit may directly output the positioning result according to the code set without error code. The positioning result represent an absolute position of the code disk 2. Since the two absolute positions of the first and second code set have a relation of a fixed sequential difference, as long as one of the first and second code set is decoded, another one is also decoded. In other words, the first code set and the second code set have only one encoded value difference in the coding sequence so that they are not completely identical to each other. However, the method of the present disclosure only output the correct positioning result corresponding to the first code set (or, alternatively, only outputs one corresponding to the second code set). The above can be achieved through a default setting of the back-end logical system. Practically, the sensing circuit stored a lookup table comprising all absolute positions of the code disk 2, the encoded values corresponding to these absolute positions, and the encoded values of the second code set corresponding to the first code set when each of the encoded values of these absolute positions is served as the first code set. The application manner of the lookup table described herein will be detailed in the subsequent step D5.

Please refer to step D2. If both the first code set and the second code set have at least one error code, the next step is step F1 for performing the reference procedure to correct the first and second code set.

Specifically, the reference procedure comprises: replacing the error code of the first code set with at least one encoded values of the second code set by the sensing circuit, with the at least one encoded values of the second set corresponding to the error code of the first code set; or replacing the error code of the second code set with at least one encoded values of the first code set by the sensing circuit, with the at least one encoded values of the first code set corresponding to the error code of the second code set. In short, when the first code set of the main column $M_C$ and the second code set of the slave column $S_C$ are viewed together as shown in FIG. 4A, the reference procedure mutually compares two encoded values located in the same row and replaces the error code. A part of error codes of the first code set or the second code set can be corrected by repeating the above step. It is additionally noted that, in another embodiment, the reference procedure may use the encoded value of a different row to perform the replacement of the error code as long as it is not encoded in the first direction in the normal order. The present disclosure does not limit to taking the encoded value of the same row for reference. Basically, the recoverable part in the reference procedure is located in different rows of the first code set and the second code set. The reference procedure does not process the condition if the first code set and the second code set have duplicate codes located in the same row, and the method of the present disclosure leave such condition to a subsequent step for correction.

After the reference procedure of step F1 is performed, the next step is step D3, determining whether a verification procedure pass or not. Specifically, the sending circuit determines whether the corrected first code set and the corrected second code set have a duplicated code firstly. If the determination result is positive, it means that the first code set and the second code set has an identical encoded value in the same row so that the reference procedure cannot correct this kind of error, and the sensing circuit outputs the verification result showing fail. On the other hand, if both the corrected first code set and the corrected second code set do not have the duplicated code, the sensing circuit calculates a review code respectively according to the above two code sets. The calculation manner adopted for the review codes of the first and second code sets is same as that of the check codes, such as parity bit. The sensing circuit determines whether the review code of the corrected first code set is identical to the check code of the original first code set, and determines whether the review code of the corrected second code set is identical to the check code of the original second code set. If the results of the above two determinations are both negative, the sensing circuit outputs a verification result showing fail. Otherwise, if the sensing circuit finds that at least one of the corrected first code set and the corrected second code set meets the original check code, it means that the correction performed in step F1 has already recover the correct encoded values from the stained encoded values. The sensing circuit determines whether the corrected first code set and the corrected second code set are arranged as Gray code. If the determination is negative, the sensing circuit output the verification result showing fail. Otherwise, the sensing circuit outputs the verification result showing pass to indicate that this verification procedure is done if the corrected first and second code set are arranged as Gray code, and the next step is step R0 for outputting the positioning result by the sensing circuit according to the corrected first code set or the corrected second code set.

Continuing with step D3, if the verification result generated by the verification procedure showing fail, the next step is step D4, determining whether the first code set is equal to the second code set. Specifically, two conditions may occur after the sensing circuit performs the reference procedure. Condition 1: the corrected first code set and the corrected second code set only differ in one bit, and the rest of encoded values are all the same. Condition 2: the corrected first code set is identical to the corrected second code set. It should be noticed that if the corrected first code set and the corrected second code set respectively have an error code of the same row, this two error codes are referred to as the same encoded values in step D4.

Continuing with step D4, if the corrected first code set is not equal to the corrected second code set, that is, the aforementioned condition 1, the sensing circuit performs the first correction procedure. On the other hand, if the corrected first code set is equal to the corrected second code set, that is, the aforementioned condition 2, the sensing circuit performs the second correction procedure. The steps of these two correction procedures will be described as follows.

The first correction procedure comprises step F2 to D5. Please refer to step F2, enumerating all possible combinations of the error codes of the first code set according to the check code. For example, if the original first code set includes three error codes in its encoded values, eight ($2^3$) candidate combinations can be enumerated under the premise that all of the encoded values are binary numbers. The first correction procedure further substitutes the candidate combinations for the error code to generate a plurality of candidate test codes, calculates the review codes of the candidate test codes according to the calculation manner of the check code, and deletes a part of candidate combinations whose review code is not equal to the check code.

Please refer to step F3, performing the reference procedure to recover the second code set. In detail, regarding each of the error codes in the second code set, it can be replaced by referring to the encoded value of the candidate first code set located in the same row. The candidate first code set refers to each of the candidate combinations whose review code is equal to the check code after the step F2 is finished.

Therefore, according to the number of the candidate first code sets, the candidate second code sets of the same number can be recovered.

Please refer to step D5, performing a table-searching procedure to determine whether only one candidate combination exists in the lookup table. Specifically, the sensing circuit compares all table entries (each table entry is the encoded value of the master columns $M_C$ with encoded values of slave columns $S_C$ corresponding to the master column $M_C$) one by one with the candidate combinations which are the candidate second code sets or the candidate first code sets obtained in step F3 or step F5. The sensing circuit determines whether the comparison result has only one solution, which means that only one candidate first code or candidate second code conforms to the encoded values of the main column $M_C$ and the encoded values of the slave column $S_C$. If the determination result of step D5 is positive, which means that the first code set and the second code set before being stained by the oil may be restored after performing the first correction procedure, the next step is step R0 for outputting the positioning result. Conversely, if there are at least two groups of candidate first code sets and candidate second code sets which conform to the entries in the lookup table, it means that the stained encoded values locate in the same row of the master column $M_C$ and the slave column $S_C$, and at least two positions of the same row are stained. Since there are at least two sets of encoded values corresponding to at least two possible absolute positions, the process proceeds step R1 to report an error, and output an error-reporting signal without outputting the positioning result.

Please refer to step D4, determining whether the first code set is identical to the second code set. If the corrected first code set is identical to the corrected second code set, the sensing circuit performs the second correction procedure, which comprises step F4 to D5. Please refer to step F4, enumerating all possible combinations of the error codes. Specifically, the step F4 is similar to step F2, and the difference between them lies in that the step F4 enumerates all possible combinations of the error code of the first code set and the error code of the second code set, respectively.

Please refer to step F5, excluding a part of combinations. Specifically, regarding the plurality of candidate first code sets and the plurality of candidate second code sets obtained in step F4, the sensing circuit respectively calculates a plurality of review codes according to their encoded values, and compares each of the review codes and each of the check codes to exclude at least one candidate first code set and at least one candidate second code set. Further, the sensing circuit matches each of candidate first code sets with each of candidate second code sets to exclude the combination which are not arranged as Gray code. After the above excluding process, step D5 is performed next. Since step D5 has been introduced previously, it will not be described again.

It should be noticed that in the process of FIG. 9, it assumes that the check code is not stained by the oil and have a correct encoded value. In another embodiment, if the check code of the first code set has an error, it can be restored by comparing the check code of the first code set with the check code of the second code set. The check codes of the first and second code sets must be opposite to each other. For example, the check code of the second code set is "1" if the check code of the first code set is "0". On the other hand, the check code of the second code set is "0" if the check code of the first code set is "1". As a result, when the check codes of the first and second code sets have errors simultaneously, the step of using the check code for error correction can be skipped and the step D5 is performed directly to determine whether there is only one solution in every combination of the first code set and the second code set. If the determination result is positive, the positioning result of this solution may be outputted. Otherwise, the next step is step R1 for outputting the error-reporting signal.

In overall, the encoded-value-outputting method with error detection and correction have the following effects.

When both of the master column and the slave column have error codes, if the error codes is not the only one different encoded values between the master and slave columns (both of the master column and the slave column only differ in one encoded value according to the rule of Gray code, and this different encoded values code is referred to as the different code below), the encoded-value-outputting method may perform the reference procedure to correct the error. If there are N*2 bits of the encoded values of the master column, the probability of such condition is (N−1)/N.

If the error code locates in the position of the different code, the encoded-value-outputting method may use the check code to correct the error. The probability of such condition is 1/N.

If the error code locates in the same row of the master column and the slave column, the encoded-value-outputting method may use the check code to correct the error. In other word, the design of the check code may restore one error of the same row.

If there are at least two error codes in the same row of the master column and the slave column, basically the encoded-value-outputting method may use the reference procedure, the first correction procedure and the second correction procedure to correct the errors.

To more clearly describe the encoded-value outputting method with error detection and correction according to an embodiment of the present disclosure, several examples are given below. The first code set and the second code each have 10 encoded values, the check code adopts the parity bit, and the "?" mark is an error code detected by the sensing circuit due to oil stain.

the $8^{th}$ bit of the second code set with the encoded value "0" of the $8^{th}$ bit of the first code set. After performing the step F1, the result is shown as the right table in the above. The next step is step D3 for performing the verification procedure. Both the corrected first code set and the corrected second code set do not have the error code. Further, in the corrected first code set which has 10 bits, there are only one bit whose encoded value is 1, so the review code of the corrected first code set is 1. The original first code set has only one error, and the corrected first and second code set are arranged as Gray code, so the next step is step R0, outputting the position result according to the corrected first code set.

| Bit order | First code set | Second code set | Bit order | First code set | Second code set |
|---|---|---|---|---|---|
| 10 | ? | 0 | 10 | 0 | 0 |
| 9 | 0 | 0 | 9 | 0 | 0 |
| 8 | ? | 0 | 8 | 0 | 0 |
| 7 | 0 | 0 | 7 | 0 | 0 |
| 6 | ? | 0 | 6 | 0 | 0 |
| 5 | ? | 0 | 5 | 0 | 0 |
| 4 | 0 | ? | 4 | 0 | 0 |
| 3 | 0 | 0 | 3 | 0 | 0 |
| 2 | 0 | 1 | 2 | 0 | 1 |
| 1 | 1 | 1 | 1 | 1 | 1 |
| Check code | 1 | 0 | Review code | 1 | 0 |

Example 2

Please refer to the left table shown above. Because the first code set and the second code set both have error codes, the processing flow is S0→D1→D2→F1. The reference procedure is performed in step F1 and the result is shown as the right table in the above. Because the second code set has less error code, after confirming that the second code set does not have the error code and the review code of the corrected second code set is the same as the check code of the original second code set, and the corrected second code set and the corrected first code set are arranged as Gray code, the processing flow is F1→D3→R0.

| Bit order | First code set | Second code set | Bit order | First code set | Second code set | Bit order | First code set | Second code set | Bit order | First code set | Second code set |
|---|---|---|---|---|---|---|---|---|---|---|---|
| 10 | 0 | 0 | 10 | 0 | 0 | 10 | 0 | 0 | 10 | 0 | 0 |
| 9 | 0 | 0 | 9 | 0 | 0 | 9 | 1 | 1 | 9 | 1 | 1 |
| 8 | 0 | ? | 8 | 0 | 0 | 8 | 0 | ? | 8 | 0 | 0 |
| 7 | 0 | 0 | 7 | 0 | 0 | 7 | 1 | 1 | 7 | 1 | 1 |
| 6 | 0 | 0 | 6 | 0 | 0 | 6 | 1 | 1 | 6 | 1 | 1 |
| 5 | 0 | 0 | 5 | 0 | 0 | 5 | ? | ? | 5 | ? | ? |
| 4 | 0 | 0 | 4 | 0 | 0 | 4 | 1 | 1 | 4 | 1 | 1 |
| 3 | ? | 0 | 3 | 0 | 0 | 3 | 0 | 0 | 3 | 0 | 0 |
| 2 | 0 | 1 | 2 | 0 | 1 | 2 | ? | 1 | 2 | 1 | 1 |
| 1 | 1 | 1 | 1 | 1 | 1 | 1 | 1 | ? | 1 | 1 | 1 |
| Check code | 1 | 0 | Review code | 1 | 0 | Check code | 1 | 0 | Review code | | |

Example 1

Please refer to the left table shown above, which shows the first and second code set obtained by the sensing circuit after step S0 is performed. Because the $3^{rd}$ bit of the first code set is an error code, step D2 is performed next. Because the $8^{th}$ bit of the second code set is an error code, the next step is step F1 for performing the reference procedure, which comprises: replacing the error code "?" of the $3^{rd}$ bit of the first code set with the encoded value "0" of the $3^{rd}$ bit of the second code set, and replacing the error code "?" of Example 3

Please refer to the left table shown above. The processing flow is S0→D1→D2→F1. After step F1 is performed, the $5^{th}$ bit of the encoded values of the first and second code set have error codes in the same row that cannot be corrected. Therefore, the verification result outputted in step D3 shows fail. Please refer to step D4 shown in FIG. 9. Except for the error code, the remaining encoded values of the first code set are as same as those of the second code set. Therefore, the processing flow is D3→D4→F4. In step F4, since the original first code set has two error codes, the sensing circuit may enumerate four candidate combinations of the error codes, that is, (0, 0), (0, 1), (1, 0), and (1, 1). Similarly, the second code set has eight candidate combinations of error codes. After all the candidate combinations of the error codes of the first and second code sets are enumerated, the next step is step F5. In step F5, since the check code of the first code is 1, and the recognizable encoded values of the first code set include an odd number of 1, the candidate combinations of the error codes of the first code set with an odd number of 1 should be excluded. Practically, the sensing circuit substitutes the four possible combinations into the original first code set to generate four candidate first code sets, calculates four review codes of these four candidate first code sets, and excludes two candidate combinations (0, 1) and (1, 0) which causes the review code different from the check code. Similarly, four possible combinations of the error codes of the second code set (0, 0, 0), (0, 1, 1), (1, 0, 1), and (1, 1, 0) may be excluded and the next step is step D5. In step D5, the sensing circuit substitutes the remaining two candidate combinations (0, 0), (1, 1) into the original first code set to generate two candidate first code sets, and substitutes the remaining candidate combinations (0, 0, 1), (0, 1, 0), (1, 0, 0), and (1, 1, 1) into the original second code set to generate four candidate second code sets. The sensing circuit searches the lookup table with the aforementioned two candidate first code sets, and finds out that when the candidate combination is (0, 0), the candidate second code set with candidate combination (0, 0, 1) can be found in the lookup table. However, when the candidate first code set is substituted with the candidate combination of (1, 1), there is no candidate second code set in the lookup table so that the first code set and the second set are arranged as Gray code. In other word, there is only one candidate combination existing in the lookup table when the candidate combination of the first code set is (0, 0). Thereafter, the next step is step R0 for outputting the positioning result after the error correction.

In view of the above, the optical absolute rotary encoder disclosed in the present disclosure adopts Manchester code as the error detection mechanism, and designs the error correction logic based on Gray code property (two successive values differ in only one bit) so that the encoder can output a correct absolute position when some encoded values of the code disk are stained by oil, and thus the anti-stain effect is achieved. In addition, the code disk of the present disclosure adopts some special encoding mechanism such as column-skipping encoding and interlaced arrangement, as well as the designed shape and disposed location of the photosensor element, so the stain-tolerable area of the code disk, the number of stained areas, and the light-receiving areas of the photosensor element can increase. The SNR (signal-to-noise) ratio can be also improved and the risk of outputting the wrong absolute position can be reduced, resulting in a robust and highly stain-resistant optical absolute rotary encoder.

What is claimed is:

1. An encoded-value-outputting method with error detection and correction, with the method adapted to an optical absolute rotary encoder to be illuminated by a light source, wherein the optical absolute rotary encoder comprises a code disk, a sensing circuit, and two photosensor arrays, with the method comprising:
  obtaining a first code set and a second code set respectively by the two photosensor arrays, wherein the first and second code sets are obtained from two disk sectors of the code disk illuminated by the light source; each of the first and second code sets comprises a plurality of encoded values, and the encoded values of the first code set and the encoded values of the second code set are arranged as Gray code; and
  outputting a location result, an error-reporting signal or a corrected location result selectively by the sensing circuit according to a determination result of whether the first and second code sets are arranged as Gray code;
  detecting whether an error code exists in the first and second code sets respectively by the sensing circuit before outputting the location result or the error-reporting signal;
  wherein the sensing circuit outputs the location result based on one of the first and second code sets when the first or second code set based on which the location result outputted does not have the error code; or the sensing circuit performs a reference procedure to correct the first and second code sets when the error code and another error code respectively exist in the first and second code sets.

2. The encoded-value-outputting method of claim 1, wherein the first code set has a check code and the second code set has another check code, and the method further comprises:
  performing a verification procedure to generate a verification result according to a corrected first code set, a corrected second code set, the check code of the first code, and the check code of the second code set by the sensing circuit after performing the reference procedure and before outputting the location result or the error-reporting signal;
  wherein the sensing circuit outputs the location result when the verification result shows pass; or the sensing circuit determines whether the corrected first code set is identical to the corrected second code set when the verification result shows fail;
    wherein the sensing circuit performs a first correction procedure when the corrected first code set is not equal to the corrected second code set; or the sensing circuit performs a second correction procedure when the corrected first code set is equal to the corrected second code set.

3. The encoded-value-outputting method of claim 1, wherein detecting whether the error code exists in the first and second code sets respectively further comprises:
  detecting each of the plurality of encoded values of the first code set and each of the plurality of encoded values of the second code set by the sensing circuit according to a determination result of whether each of the plurality of encoded values is arranged in Manchester code, wherein each of the plurality of encoded values comprises two bits.

4. The encoded-value-outputting method of claim 1, wherein the location result is associated with an absolute position of the code disk.

5. The encoded-value-outputting method of claim 1, wherein the reference procedure comprises:
  replacing the error code of the first code set with at least one encoded values of the second code set by the sensing circuit, with the at least one encoded values of the second set corresponding to the error code of the first code set; or replacing the error code of the second code set with at least one encoded values of the first code set by the sensing circuit, with the at least one encoded values of the first code set corresponding to the error code of the second code set.

6. The encoded-value-outputting method of claim 2, wherein the check code of the first code set is a parity bit of the plurality of the encoded values of the first code set and the check code of the second code set is a parity bit of the plurality of the encoded values of the second code set.

7. The encoded-value-outputting method of claim 2, wherein the verification procedure comprises:
- detecting whether the corrected first code set and the corrected second code set have a duplicated code by the sensing circuit;
- wherein the sensing circuit outputs the verification result showing fail when the corrected first code set and the corrected second code set have a duplicated code; or the sensing circuit calculates a review code according to the plurality of encoded values of the corrected first code set and the plurality of encoded values of the corrected second code set when the corrected first code set and the corrected second code set do not have the duplicated code;
- determining whether the two review codes are identical to the two corresponding check codes respectively; wherein the sensing circuit outputs the verification result showing fail when the review code of the corrected first code set is not equal to the check code of the first code set or when the review code of the corrected second code set is not equal to the check code of the second code set; and
- determining whether the corrected first code set and the corrected second code set are arranged as Gray code by the sensing circuit when the two review codes are identical to the two corresponding check codes respectively; wherein the sensing circuit outputs the verification result showing fail when the corrected first code set and the corrected second code set are not arranged as Gray code, or the sensing circuit outputs the verification result showing pass when the corrected first code set and the corrected second code set are arranged as Gray code.

8. The encoded-value-outputting method of claim 2, wherein the first correction procedure comprises:
- enumerating a combination of candidate encoded values of the error code of the first code set according to the check code of the first code set and generating a plurality of candidate first code sets by the sensing circuit;
- performing the reference procedure according to the combination of candidate encoded values by the sensing circuit to generate a plurality of candidate second code sets corresponding to the plurality of candidate first code sets;
- performing a table-searching procedure by the sensing circuit according to the plurality of the candidate first code sets, the plurality of the candidate second code sets, and a lookup table to determine whether only one candidate combination exists in the lookup table, wherein the plurality of the candidate first code sets and the plurality of the candidate second code sets forms a plurality of candidate combinations; and
- outputting the locating result or the error-reporting signal selectively by the sensing circuit according to the candidate combination.

9. The encoded-value-outputting method of claim 2, wherein the second correction procedure comprises:
- enumerating a combination of candidate encoded values of the respective error code of the first and second code sets by the sensing circuit and generating a plurality of candidate first code sets and a plurality of candidate second code sets;
- excluding at least one of the candidate first code sets and at least one of the candidate second code sets by the sensing circuit, wherein the at least one of the candidate first code set does not conform the check code of the first code set and the at least one of the candidate second code set does not conform the check code of the second code set;
- excluding a candidate combination which is not arranged as Gray code from the plurality of candidate first code sets and the plurality of candidate second code sets, wherein the candidate combination comprises one of the pluralities of candidate first code sets and one of the pluralities of candidate second code sets;
- performing a table-searching procedure by the sensing circuit according to the excluded candidate first code sets, the excluded candidate second code sets, and a lookup table to determine whether only one candidate combination exists in the lookup table, wherein the plurality of candidate first code sets and the plurality of candidate second code sets form the plurality of candidate combinations; and
- outputting the locating result or the error-reporting signal selectively by the sensing circuit according to the candidate combination.

\* \* \* \* \*